(12) United States Patent
Larky

(10) Patent No.: US 6,565,053 B1
(45) Date of Patent: May 20, 2003

(54) CANE HOLDER

(76) Inventor: Joshua Larky, 13745 Nogales Dr., Del Mar, CA (US) 92014-3338

(*) Notice: Subject to any disclaimer, the term of this patent is extended or adjusted under 35 U.S.C. 154(b) by 0 days.

(21) Appl. No.: 10/054,056

(22) Filed: Jan. 22, 2002

(51) Int. Cl.[7] .............................................. A47B 96/06
(52) U.S. Cl. .............................. 248/229.1; 248/229.11; 211/62
(58) Field of Search ................... 248/229.1, 316.2, 248/312, 229.11, 110, 113; 211/62, 65, 70, 70.6

(56) References Cited

U.S. PATENT DOCUMENTS

| | | | | |
|---|---|---|---|---|
| 3,722,652 A | * | 3/1973 | Busch et al. .................. 194/256 |
| 3,964,441 A | | 6/1976 | Wall .............................. 119/109 |
| 4,121,798 A | | 10/1978 | Schumacher et al. ......... 248/229 |
| 4,211,380 A | * | 7/1980 | Lillegard et al. .............. 24/328 |
| 4,300,742 A | | 11/1981 | Hunn ............................ 248/360 |
| 4,528,768 A | * | 7/1985 | Anderson ...................... 248/514 |
| 4,605,190 A | | 8/1986 | Kamp ............................ 248/316.7 |
| 4,688,961 A | * | 8/1987 | Shioda et al. ................. 24/580.11 |
| 4,700,830 A | * | 10/1987 | O'Brien ........................ 15/257.06 |
| 4,705,177 A | * | 11/1987 | Oren ............................ 211/70.5 |
| 4,848,714 A | * | 7/1989 | Ziaylek et al. ................ 248/313 |
| 4,884,730 A | | 12/1989 | Carpenter ..................... 224/162 |
| 4,895,330 A | | 1/1990 | Anstead ........................ 248/229 |
| 4,903,929 A | * | 2/1990 | Hoffman ........................ 24/335 |
| 4,958,758 A | | 9/1990 | Tipple et al. .................. 224/267 |
| 5,388,623 A | * | 2/1995 | Homma et al. ................. 152/5 |
| 5,524,657 A | | 6/1996 | Jih .............................. 135/66 |
| 5,588,166 A | * | 12/1996 | Burnett ......................... 248/214 |
| 5,758,808 A | | 6/1998 | Epps et al. .................... 224/257 |
| 5,964,385 A | | 10/1999 | Simon .......................... 224/162 |
| 5,992,811 A | * | 11/1999 | McFerren et al. ............. 248/316.3 |
| 6,000,414 A | | 12/1999 | Crusor .......................... 135/66 |
| 6,105,594 A | | 8/2000 | Diaz ............................ 135/16 |
| 6,170,500 B1 | | 1/2001 | Turechek ...................... 135/66 |

* cited by examiner

Primary Examiner—Leslie A. Braun
Assistant Examiner—A. Joseph Wujciak, III
(74) Attorney, Agent, or Firm—Christopher P. Maiorana, P.C.

(57) ABSTRACT

An apparatus for coupling a cane to a non-planar object. The apparatus may comprise a first section and a second section. The first section may have a front side and a rear side. The front side may be configured to removably grasp the cane. The second section may have a second front side and a second rear side. The second front side may be configured to removably grasp the non-planar object. The first section and the second section are coupled such that the first section is adjustable relative to the second section.

13 Claims, 7 Drawing Sheets

CANE HOLDER

FIELD OF THE INVENTION

The present invention relates to an apparatus for rotatably holding cylindrical objects generally and, more particularly, to an apparatus and/or method for holding a cane in close proximity to a user when not in use.

BACKGROUND OF THE INVENTION

Canes are often used for movement and support by aged, permanently disabled or temporarily physically disabled individuals. These devices typically include a cylindrical support pole and a handhold structure. The size of the handhold structure remains relatively constant. The length of the support pole varies depending on the distance between the hand of a user, at extension, and the foot of the user. The diameter of the support is relatively constant for all types of canes. The support can be hollow or solid.

Although required for mobility, canes become unnecessary when the individual is seated or reclined and, accordingly, must be stored by the user. For example, users who switch between a cane and a wheelchair must carry the cane somewhere (e.g., on their lap). During non-use (e.g., at a restaurant) canes may be stored by placing them against a wall or other surface within the proximity of the user. Canes placed in such positions, however, often slide on the wall surface, and fall to the ground making it difficult, if not awkward, for the user to retrieve the cane without some outside assistance. A cane placed against a wall or table can also be an obstacle to wait staff and other customers.

It would be desirable to have a cane holder that is adjustable and can attach to a variety of surfaces, such as a wheelchair or restaurant chair.

SUMMARY OF THE INVENTION

The present invention concerns an apparatus for coupling a cane to a non-planar object. The apparatus may comprise a first section and a second section. The first section may have a front side and a rear side. The front side may be configured to removably grasp the cane. The second section may have a second front side and a second rear side. The second front side may be configured to removably grasp the non-planar object. The first section and the second section are coupled such that the first section is adjustable relative to the second section.

The objects, features and advantages of the present invention include providing a holder that may be (i) attached to non-planar surfaces, (ii) adjusted to allow a user to easily reach an object held by the holder and/or (iii) used to hold a variety of cylindrical and non-cylindrical cane type elongated objects.

BRIEF DESCRIPTION OF THE DRAWINGS

These and other objects, features and advantages of the present invention will be apparent from the following detailed description and the appended claims and drawings in which:

FIGS. 6(A–B) are cross-section views of alternative embodiments of the present invention.

DETAILED DESCRIPTION OF THE PREFERRED EMBODIMENTS

Figure 1:
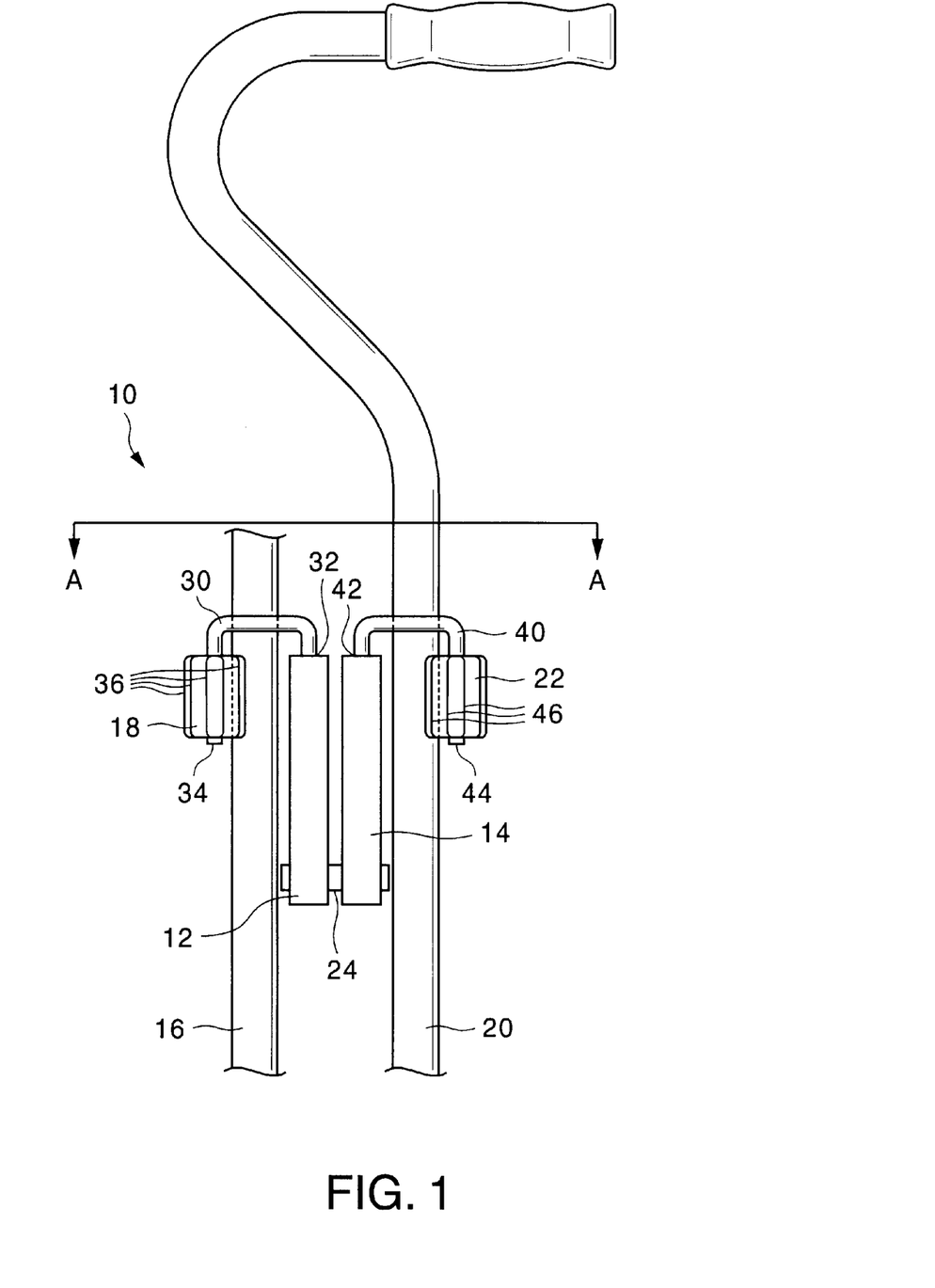
FIG. 1 is a lateral view of a preferred embodiment of the present invention.

Referring to FIG. 1, a lateral view of a holder 10 is shown illustrating a preferred embodiment of the present invention. The holder 10 generally comprises a first section 12 and a second section 14. The section 12 may have a front side and a rear side. In one example, the front side may be configured to grasp a non-planar object 16. In one example, the object 16 may be a portion of a chair or wheelchair. In particular, the object 16 may be an armrest, back, side, etc. of a chair, bench, wheelchair, etc. Alternatively, the object 16 may be part of a table (e.g., a leg) or a device for assisting people with a disability (e.g., an assist bar, etc). A pair of cams (or rollers) 18 may be attached to the section 12. The cams 18 may comprise, in one example, a flexible (or elastic) material (e.g., rubber, nylon, etc.). The material may be selected to provide a coefficient of friction with the object 16 sufficient to prevent slipping of the object 16. The cams 18 may be configured to (i) allow easy attachment and removal of the object 16 to and from the section 12 and (ii) grasp securely the object 16 when attached to the section 12.

The section 14 may have a front side and a rear side. The section 14 may be configured similarly to the section 12. The section 14 may be configured to grasp a cane 20. However, the section 14 may be configured to grasp any elongated object. Canes may be implemented with various elongated shapes and with various cross-sections (e.g., curved, square, rectangular, oval and the like, etc.), and are all within the scope of this disclosure and the appended claims. Non-regular shapes, such as a stick, are also contemplated within the scope of such elongated shapes. Additionally, canes may be constructed of various types of materials such as wood, glass (or glass like materials), metal, etc. A pair of cams (or rollers) 22 may be attached to the section 14. The cams 22 may comprise, in one example, a flexible (or elastic) material (e.g., rubber, nylon, etc.). The material may be selected to provide a coefficient of friction with the cane 20 sufficient to prevent slipping of the cane 20. The cams 22 may be configured to (i) allow easy attachment and removal of the cane 20 to and from the section 14 and (ii) grasp securely the cane 20 when attached to the section 14.

The section 14 may be coupled to the section 12 by a coupling 24. The coupling 24 may be configured to allow the section 14 to pivot (rotate) with respect to the section 12 about one or more axes of the coupling 24. The coupling 24 may be implemented, in one example, as a fastener (e.g., rivet, bolt, etc.). Alternatively, the coupling 24 may be implemented as a ball and socket. However, other types of couplings may be implemented accordingly to meet the design criteria of a particular application.

In one example, the pair of rollers 18 may be attached to the section 12 by arcuate members 30. The arcuate members 30 may have a first end 32 that may attach, in one example, at a top surface of the section 12 and a second end 34 that may, in one example, extend through the rollers 18. However, other configurations may be implemented accordingly to meet the design criteria of a particular application.

The rollers 18 may comprise a number of ridges 36 that may be disposed radially around the rollers 18 and extend axially from a first end to a second end of the rollers 18. The front side of the section 12 and the rollers 18 may define a space within which the object 16 may be securely held.

The rollers 22 may be attached to the section 14 by arcuate members 40. The arcuate members 40 may have a first end 42 that may attach, in one example, at a top surface of the section 14 and a second end 44 that may, in one example, extend through the rollers 22. However, other configurations may be implemented accordingly to meet the design criteria of a particular application. The rollers 22 may comprise a number of ridges 46 that may be disposed radially around the rollers 22 and extend axially from a first end to a second end of the rollers 22. The front side of the section 14 and the rollers 22 may define a space within which the object 20 may be securely held.

Figure 2:
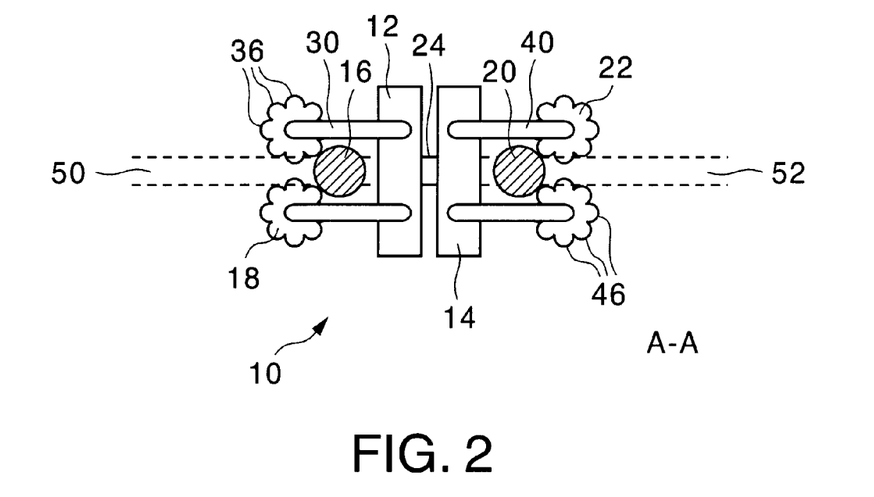
FIG. 2 is a cross-section of a preferred embodiment of the present invention.

Referring to FIG. 2, a cross-section diagram looking down along the section line A—A of FIG. 1 is shown. The object 16 is shown within the space defined by the rollers 18 and the front side of the section 12. The cane 20 is shown held within the space defined by the rollers 22 and the front side of the section 14.

The juxtaposition of the rollers 18 may define a channel 50 through which the object 16 may be attached to and removed from the section 12. The rollers 22 may form a similar channel 52 for the section 14. When the objects 16 and 20 are attached to and removed from the sections 12 and 14, the rollers 18 and 22 may be configured to rotate about the members 30 and 40, respectively. Alternatively, the members 30 and 40 may be configured to flex allowing the rollers 18 and 22 to move around the objects 16 and 20 during attachment and removal.

Figure 3:
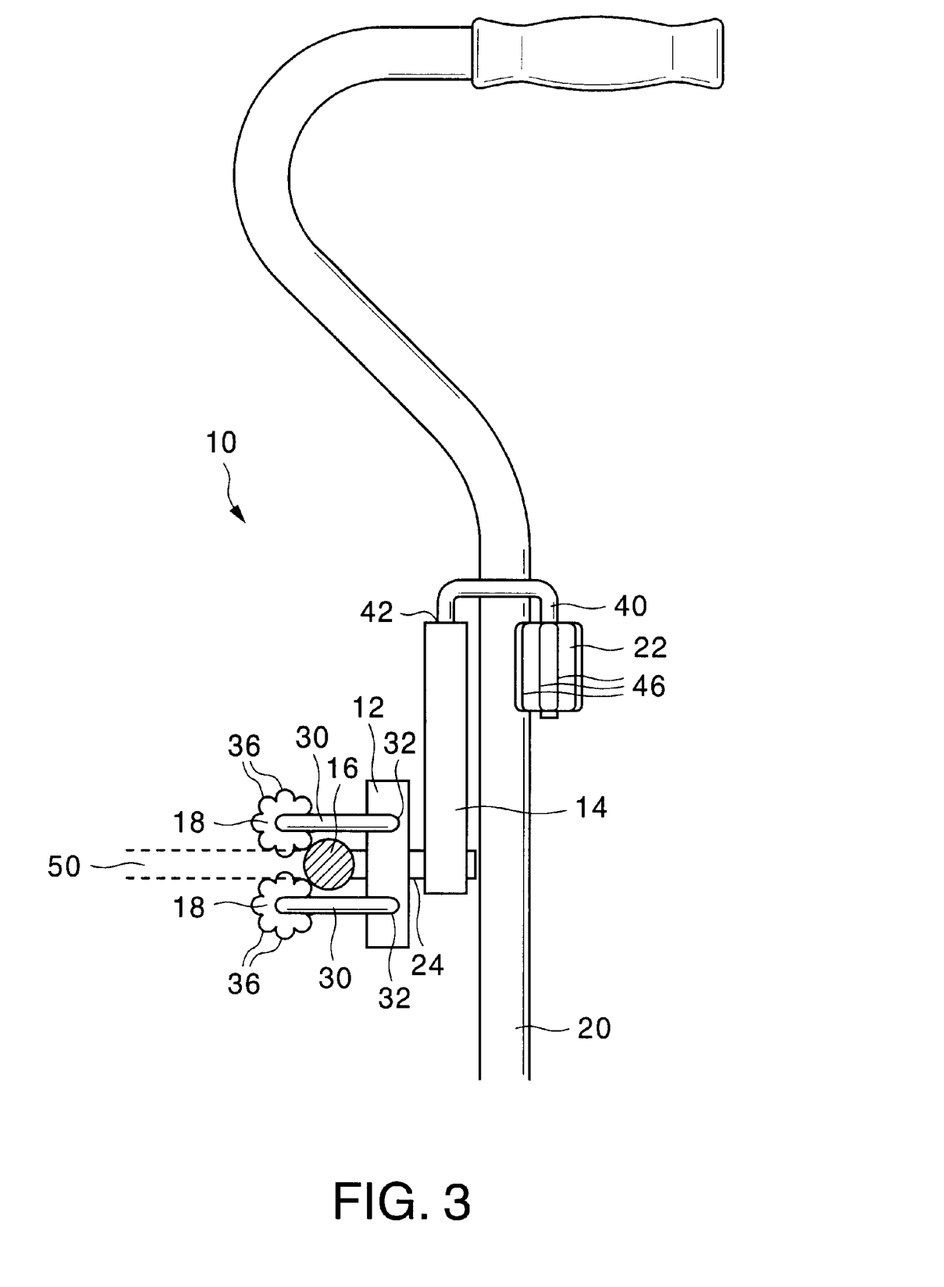
FIG. 3 is a lateral view of an alternative configuration of a preferred embodiment of the present invention.

Referring to FIG. 3, another lateral view of the holder 10 is shown illustrating an alternative configuration. The section 14 may be rotated to any angle with respect to the section 12. In one example, the sections 12 and 14 may be rotated 90 degrees with respect to one another.

Figure 4:
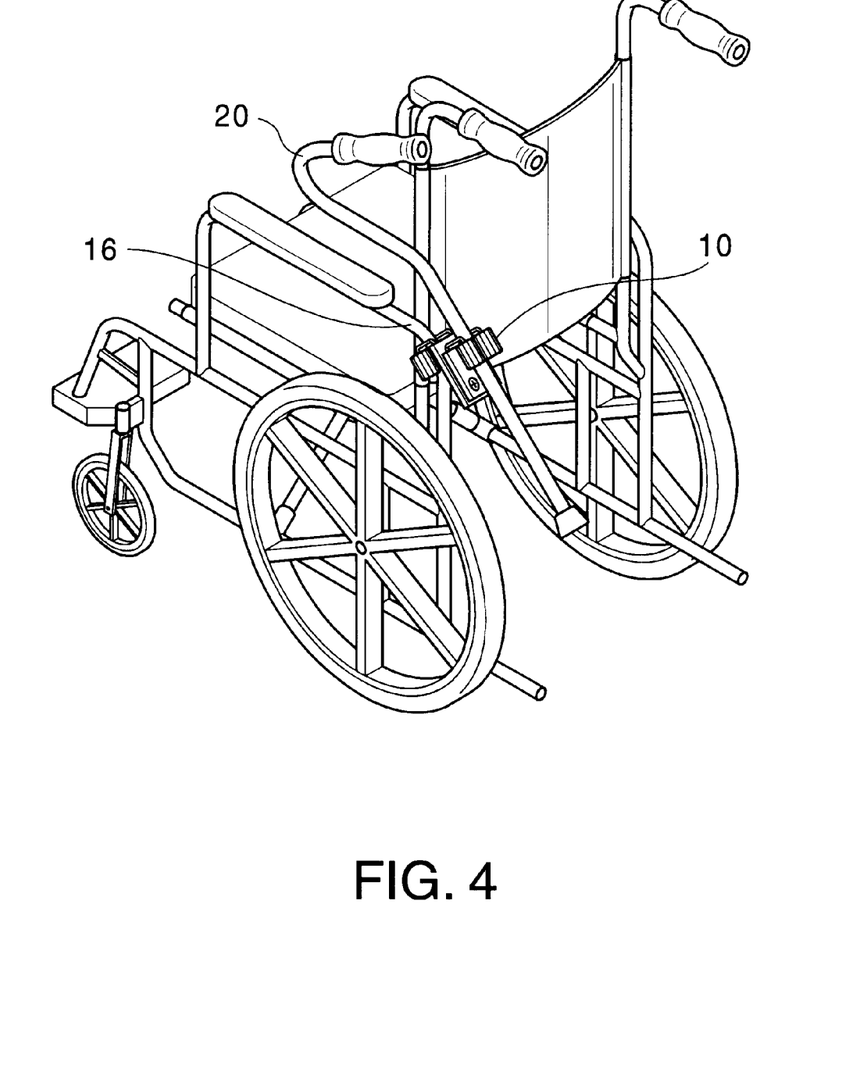
FIG. 4 is a diagram of an example application of a preferred embodiment of the present invention.

Referring to FIG. 4, an example application of a preferred embodiment of the present invention is shown. The present invention may be used to attach a cane 20 to a wheelchair frame. For example, the section 12 may be attached to a tubular armrest support of the wheelchair. The cane 20 may be attached to the section 14. The section 12 and the section 14 may be rotated relative to each other so that the cane 20 is held in a position that is convenient for a person sitting in the wheelchair to reach. Additionally, the cane 20 may be held in a position that will not interfere with operation of the wheelchair. For example, the cane 20 may be suspended off the ground away from the wheels of the wheelchair.

While FIG. 4 depicts the holder 10 mounted to the tubular frame of the wheelchair armrest, the holder 10 may be mounted to several different locations on the wheelchair frame. For example, if a person sitting in a wheelchair were to be pushed by another person, the present invention may be mounted so that the cane 20 is attached away from the backside of the wheelchair.

Figure 5:
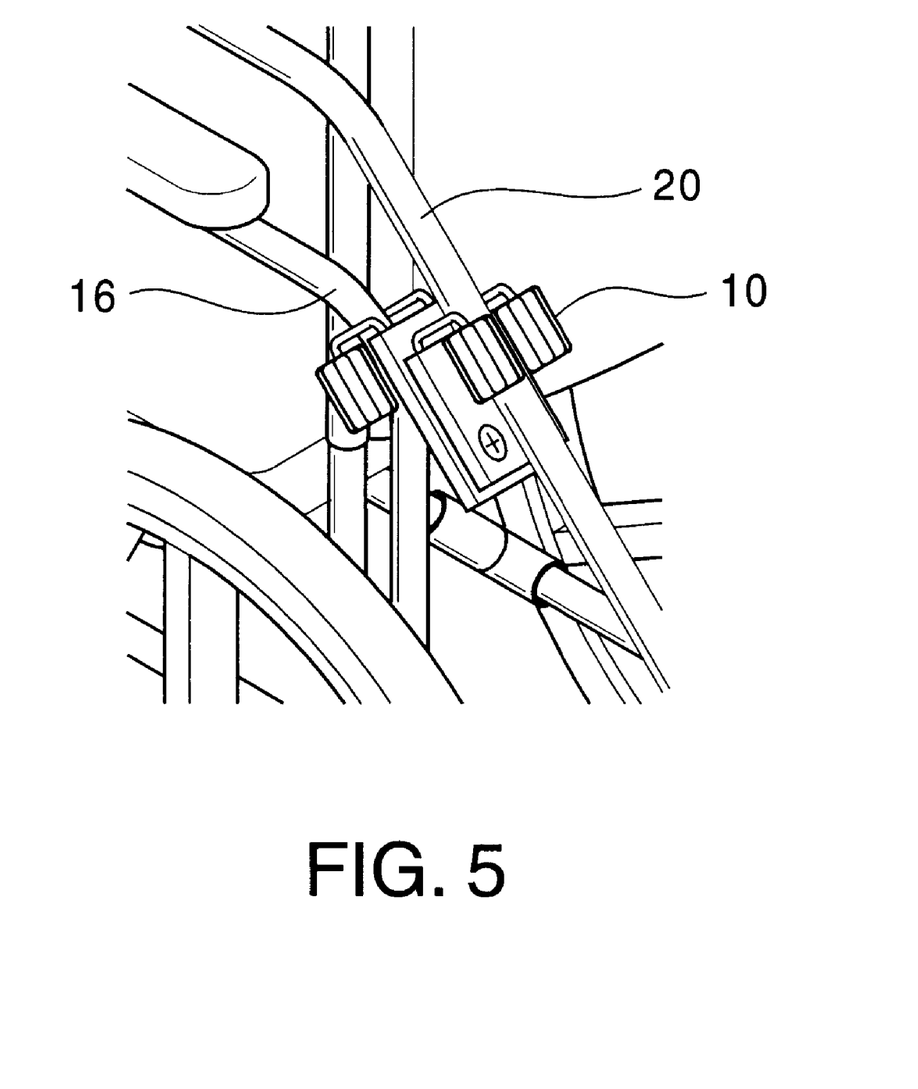
FIG. 5 is a diagram showing a closer view of the example application of FIG. 4.

Referring to FIG. 5, a closer view of the example application of FIG. 4 is shown. The present invention may allow attachment of a cane 20 to a wheelchair at any point along the cylindrically shaped (tubular) frame. Similarly, the present invention may be attached to structural members of the wheelchair having other cross-sectional shapes such as curved, square, rectangular, oval, etc.

Figure 6A:
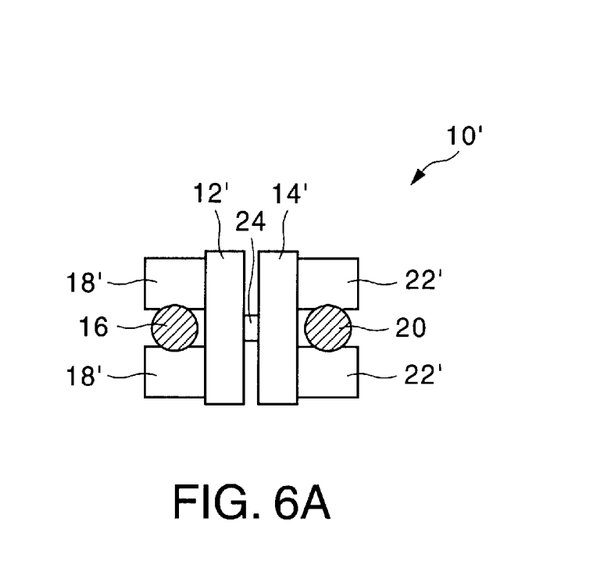
Figure 6B:
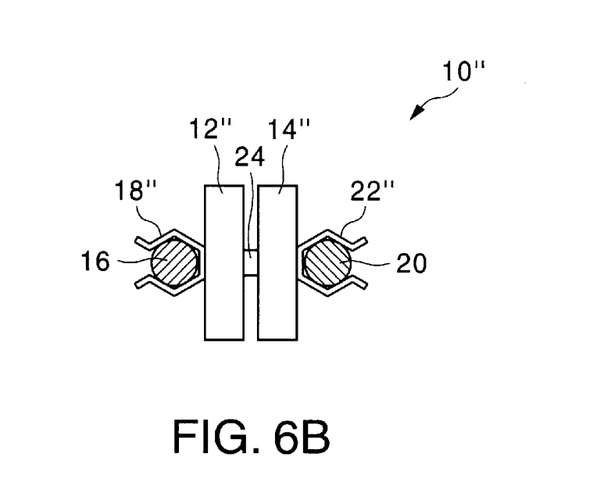

Referring to FIGS. 6a and 6b, diagrams of a holder 10' (FIG. 6A) and a holder 10" (FIG. 6B) illustrating alternative embodiments of the present invention are shown. A section 12' of the holder 10' may comprise a pair of cams (rollers) 18' that may be attached to the front side of the section 12'. The cams 18' may be implemented using a material having properties that allow the cams 18' to securely grasp the object 16. The section 14' may comprise a pair of cams (rollers) 22'. The cams 22' may be implemented similarly to the cams 18'. Referring to FIG. 6b, the sections 12" and 14" of the holder 10" may be implemented with spring clips 18" and 22", respectively. Alternatively, the section 12 may be implemented having rollers 18 that are different from the rollers 22 of the section 14. For example, the section 12 may be implemented with rollers while the section 14 may be implemented with a spring clip.

Figure 7:
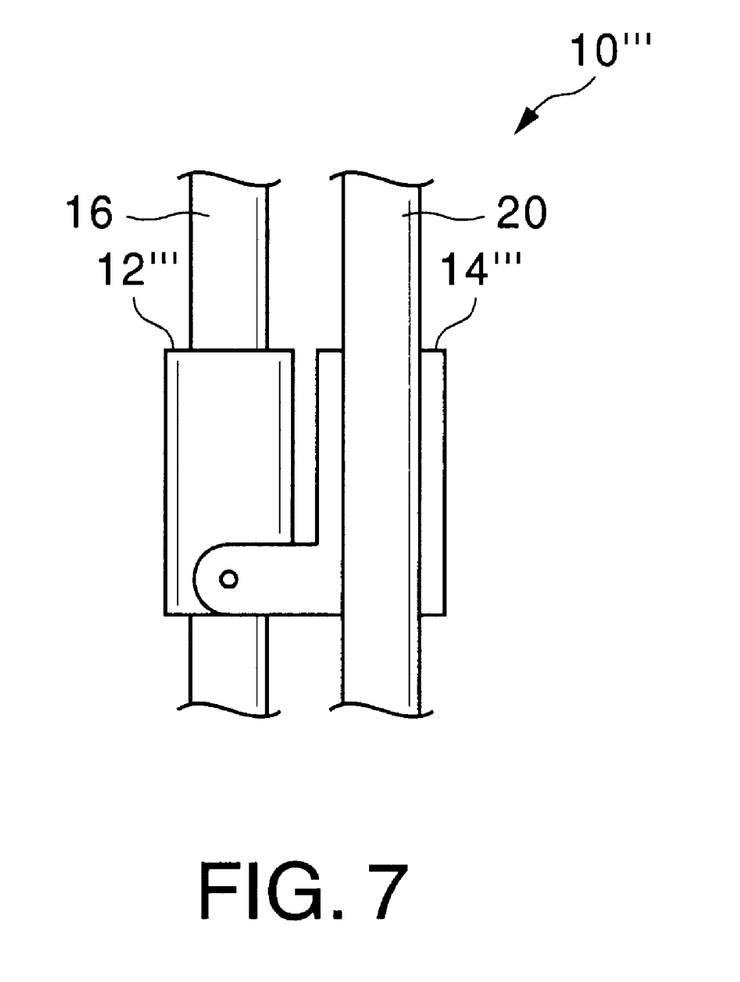
FIG. 7 is a diagram of another alternate embodiment of the present invention.

Referring to FIG. 7, a diagram of a holder 10''' illustrating another alternative embodiment of the present invention is shown. The holder 10''' may comprise a section 12''' and a section 14'''. The sections 12''' and 14''' may be attached such that the section 12''' and the section 14''' are positioned laterally to one another. The sections 12''' and 14''' may be implemented with any of the cams (or rollers) described above. The sections 12''' and 14''' may be configured to grasp the object 16 and the cane 20 on opposite sides of the sections in one example. Alternatively, the sections 12''' and 14''' may be configured to grasp the object 16 and the cane 20 on the same side of the sections (not shown).

While the invention has been particularly shown and described with reference to the preferred embodiments thereof, it will be understood by those skilled in the art that various changes in form and details may be made without departing from the spirit and scope of the invention.

What is claimed is:

1. An apparatus for coupling a cane to a non-planar object comprising:
   a first section having a front side and a rear side, said front side comprising a plurality of first rollers attached by a plurality of first arcuate members, wherein said first rollers are configured to removably grasp said cane; and
   a second section having a second front side and a second rear side, said second front side comprising a plurality of second rollers attached by a plurality of second arcuate members, said second rollers configured to removably grasp said non-planar object, wherein (i) said first section and said second section are coupled such that said first section is adjustable relative to said second section and (ii) said first section is rotatably coupled to said second section.

2. The apparatus according to claim 1, wherein said first rear side is juxtaposed with said second rear side.

3. The apparatus according to claim 1, wherein said non-planar object comprises a member of a wheelchair.

4. The apparatus according to claim 1, wherein said non-planar object comprises a portion of a chair.

5. The apparatus according to claim 1, wherein said first and second sections are coupled by one or more fasteners.

6. The apparatus according to claim 1, wherein said first section and said second section are configured to (i) allow easy attachment and removal of said cane and said non-planar object and (ii) securely hold said cane and said non-planar object when attached to said sections.

7. The apparatus according to claim 1, wherein said rollers comprise an elastic material.

8. The apparatus according to claim 1, wherein said rollers comprise a plurality of ridges disposed radially.

9. The apparatus according to claim 1, wherein said first front side and said plurality of first rollers define a first space configured to securely hold said cane and a channel communicating with said space.

10. The apparatus according to claim 1, wherein said second front side and said plurality of second rollers define a second space configured to securely hold said non-planar object and a second channel communicating with said second space.

11. An apparatus for coupling a cane to a non-planar object comprising:

a first section having a front side and a rear side, said front side comprising a plurality of first rollers attached by a plurality of first arcuate members, wherein said first rollers are configured to removably grasp said cane; and a second section having a second front side and a second rear side, said second front side comprising a plurality of second rollers attached by a plurality of second arcuate members, said second rollers configured to removably grasp said non-planar object, wherein (i) said first section and said second section are coupled such that said first section is adjustable relative to said second section and (ii) said first rear side is juxtaposed with said second rear side.

12. An apparatus for coupling a cane to a non-planar object comprising:

a first section having a front side and a rear side, said front side comprising a plurality of first rollers attached by a plurality of first arcuate members, wherein said first rollers are configured to removably grasp said cane; and a second section having a second front side and a second rear side, said second front side comprising a plurality of second rollers attached by a plurality of second arcuate members, said second rollers configured to removably grasp said non-planar object, wherein (i) said first section and said second section are coupled such that said first section is adjustable relative to said second section and (ii) said non-planar object comprises a member of a wheelchair.

13. An apparatus for coupling a cane to a non-planar object comprising:

a first section having a front side and a rear side, said front side comprising a plurality of first rollers attached by a plurality of first arcuate members, wherein said first rollers are configured to removably grasp said cane; and a second section having a second front side and a second rear side, said second front side comprising a plurality of second rollers attached by a plurality of second arcuate members, said second rollers configured to removably grasp said non-planar object, wherein (i) said first section and said second section are coupled such that said first section is adjustable relative to said second section and (ii) said non-planar object comprises a portion of a chair.

* * * * *